United States Patent
Mizukawa

[11] Patent Number: 5,771,408
[45] Date of Patent: Jun. 23, 1998

[54] FIXED FOCUS CAMERA SHOOTING HYPERFOCAL DISTANCE

[75] Inventor: Shigeo Mizukawa, Omiya, Japan

[73] Assignee: Fuji Photo Optical Co., Ltd., Omiya, Japan

[21] Appl. No.: 863,941

[22] Filed: May 27, 1997

[30] Foreign Application Priority Data

May 27, 1996 [JP] Japan ................................. 8-156001

[51] Int. Cl.$^6$ .................................................. G03B 3/00
[52] U.S. Cl. ............................................................ 396/65
[58] Field of Search ............................. 396/65, 89, 276; 348/362, 345, 335

[56] References Cited

U.S. PATENT DOCUMENTS 3,997,906  12/1976  Kashiwase ............................... 396/65
4,274,725   6/1981  Gross ....................................... 396/65
4,316,658   2/1982  Bundschuh et al. ..................... 396/65

*Primary Examiner*—W. B. Perkey
*Attorney, Agent, or Firm*—Ronald R. Snider

[57] ABSTRACT

A fixed focus camera is arranged to shorten the minimum object distance for shooting by moving a lens section to a hyperfocal distance position. The camera is arranged to mount the objective lens system and the diaphragm member on the same tube, the lens system being formed to provide fixed focus, the diaphragm member being provided with a rotating member which is rotated to reduce light from the lens system, and to connect the tube to the body with a helicoid screw so that the rotation of the tube opens and closes the diaphragm member, and moves the lens system back and forth. Then, when the diaphragm opening is reduced by the rotations of the tube, the objective lens system is moved forward to a position where the subject is captured at a hyperfocal distance. This enables it to perform shooting at a hyperfocal distance, whereby the minimum object distance for shooting can be shortened when the diaphragm opening is reduced.

2 Claims, 4 Drawing Sheets

FIXED FOCUS CAMERA SHOOTING HYPERFOCAL DISTANCE

BACKGROUND OF THE INVENTION

This application claims the priority of Japanese Patent Application No. 8-156001 filed on May 27, 1996 which are incorporated herein by reference.

1. Field of the Invention

The present invention relates to a fixed focus camera, and, more particularly, to an arrangement of camera for adjusting focus with diaphragm opening in a micro-camera or the like.

2. Description of the Prior Art

Conventionally, a micro-camera (TV camera) called a small finger camara or the like is configured to have a single focal distance (fixed focus) because it should have a small size. However, when it has a variable diaphragm, the focal distance can be moved to near distance by reducing opening of the diaphragm.

FIG. 5 shows an example of arrangement of a micro-camera. Disposed at the front end 1 of the camera shown in the figure is an objective lens system 2 behind which a diaphragm member 3 opening of which can be varied is provided. The diaphragm member 3 is linked with a diaphragm adjusting ring 4. A plurality of blades mounted on the diaphragm member 3 are moved by rotating the diaphragm ring 4, whereby the diaphragm opening 100 is varied.

Mounted behind the objective lens system 2 is an imaging device, for example, a CCD (Charge Coupled Device) 5 as an imaging element the imaging plane (front plane) of which is positioned at the far end focal distance (∞) of the objective lens system 2. With such arrangement, if the minimum blur circle in the objective lens system 2 is assumed to have a diameter of 6 as shown in the figure, the depth of focus becomes a range of Do1 when the diaphragm opening 100 (amount) of the diaphragm member 3 is at the maximum. Thus, a subject can be well captured if it is focused within this depth of focus. In addition, when the diaphragm opening 100 is the minimum, the depth of focus is within the range Dc1 on the principle that the depth becomes deeper when the diaphragm is reduced. A subject can be shot by the CCD 5 if it is focused within this depth of focus Dc1.

Therefore, the shooting distance can be shifted to near distance by reducing the diaphragm opening 100. In this case, the minimum object distance (MOD) for shooting would be determined by the depth of focus Dc1 or at the position NO shown in the figure. If exposure needs to be adjusted, it would be performed by controlling brightness of video signals obtained by CCD 5 or converting the illuminating light.

BRIEF SUMMARY OF THE INVENTION

However, the conventional micro-camera is frequently required to perform shooting at a short distance (close distance), and the minimum object distance MOD for shooting is demanded to be shorter. Particularly, since it is difficult to incorporate a focus lens in the objective lens system 2 of such camera, it is requested to further shorten the minimum object distance assuming a fixed focus lens system. In addition, it is convenient also in a fixed focus camera such as a camera with a lens that shooting can be performed at a distance shorter than the current minimum object distance.

The present invention is invented in view of the above, and intended to provide a fixed focus camera with a fixed focus lens system which can shorten the minimum object distance for shooting, whereby shooting is performed at a hyperfocal distance.

To attain the above object, the present invention comprises a lens section formed to provide fixed focus, a diaphragm member provided with a rotating member which is rotated to reduce light from the lens section, and drive means for extending and retracting the diaphragm member in interlocking with rotation of the rotating member of the diaphragm member to move the lens section back and forth so that a subject is captured at a hyperfocal distance when the diaphragm opening is reduced. The hyper focal distance means a distance to the subject when the focus is adjusted so that the farthest point of depth of field extends to the infinite point.

In addition, it is preferable to mount the lens section and the diaphragm member on the same tube, and to connect the tube to the body with a helicoid screw so that the rotation of the tube opens and closes the diaphragm member, and moves the lens section back and forth.

With the above arrangement, when the diaphragm opening (amount) becomes larger, the objective lens system is positioned at the rear position so that the imaging plane of CCD is positioned at the shooting position, for example, at the focal distance of the lens system. Then, when the becomes smaller, the objective lens system is extended forward. In this case, the objective lens system is positioned at the hyperfocal distance, or at a position where the depth behind the depth of field is set at the infinite point. Moving the objective lens system to this hyperfocal point means that the depth of focus (depth of field) is extended independent of the diaphragm opening, so that the range allowing shooting is shifted to the near distance. Thus, the minimum object distance of shooting is made shorter.

BRIEF DESCRIPTION OF THE DRAWINGS

FIG. 1 (B) is the fixed focus camera of the embodiment shown in a sectional view of operation state for shooting at a near distance;

FIG. 2 (B) is the arrangement of rotating member in the diaphragm member of the embodiment;

FIG. 4 (B) is a diagram illustrating the depth of focus when the diagram is reduced on the camera of the present invention, and the objective lens system is positioned at the hyperfocal distance;

DETAILED DESCRIPTION OF THE PREFERRED EMBODIMENTS

Figure 1A:
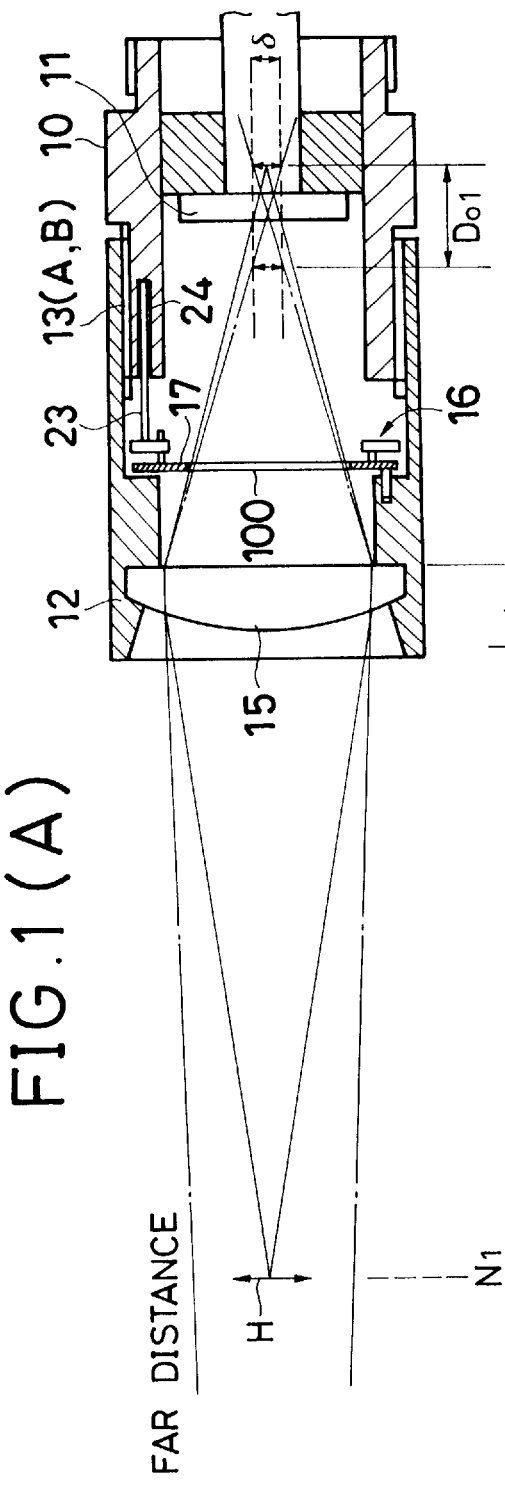
FIG. 1 (A) is a fixed focus camera as one embodiment of the present invention shown in a sectional view of operation state for shooting at a far distance.
Figure 1B:
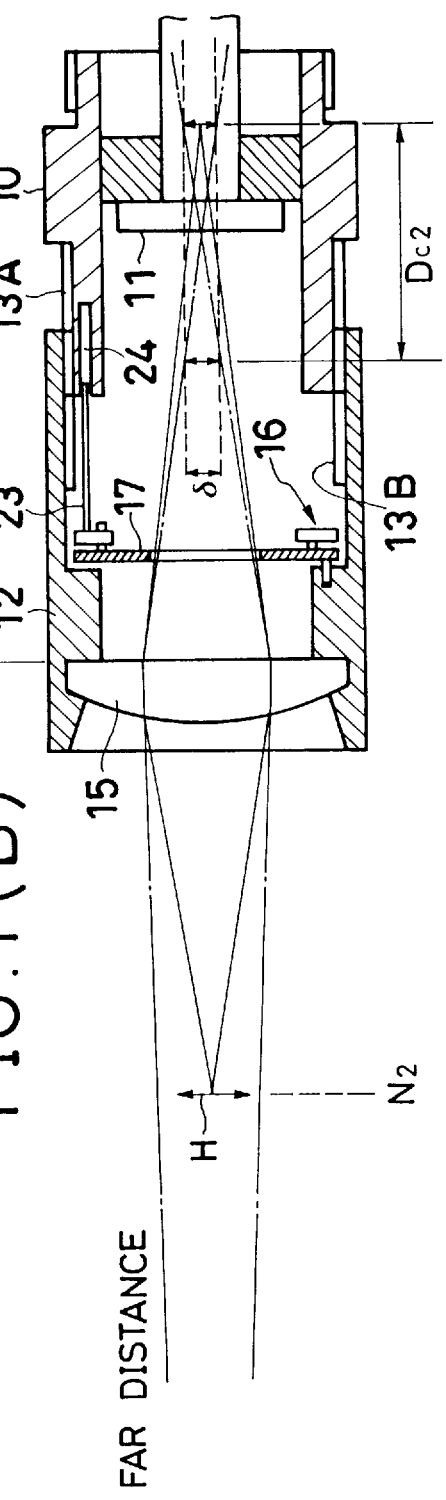
Figure 3:
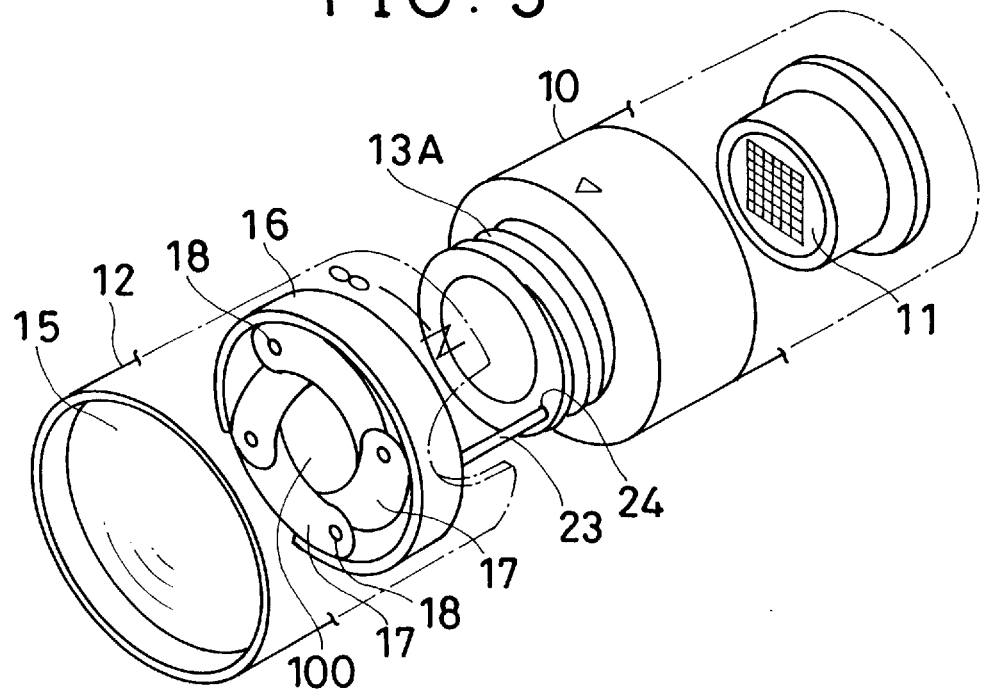
FIG. 3 is a partial sectional view showing the arrangement of the fixed focus camera of the embodiment.
Figures 4A, 4B:
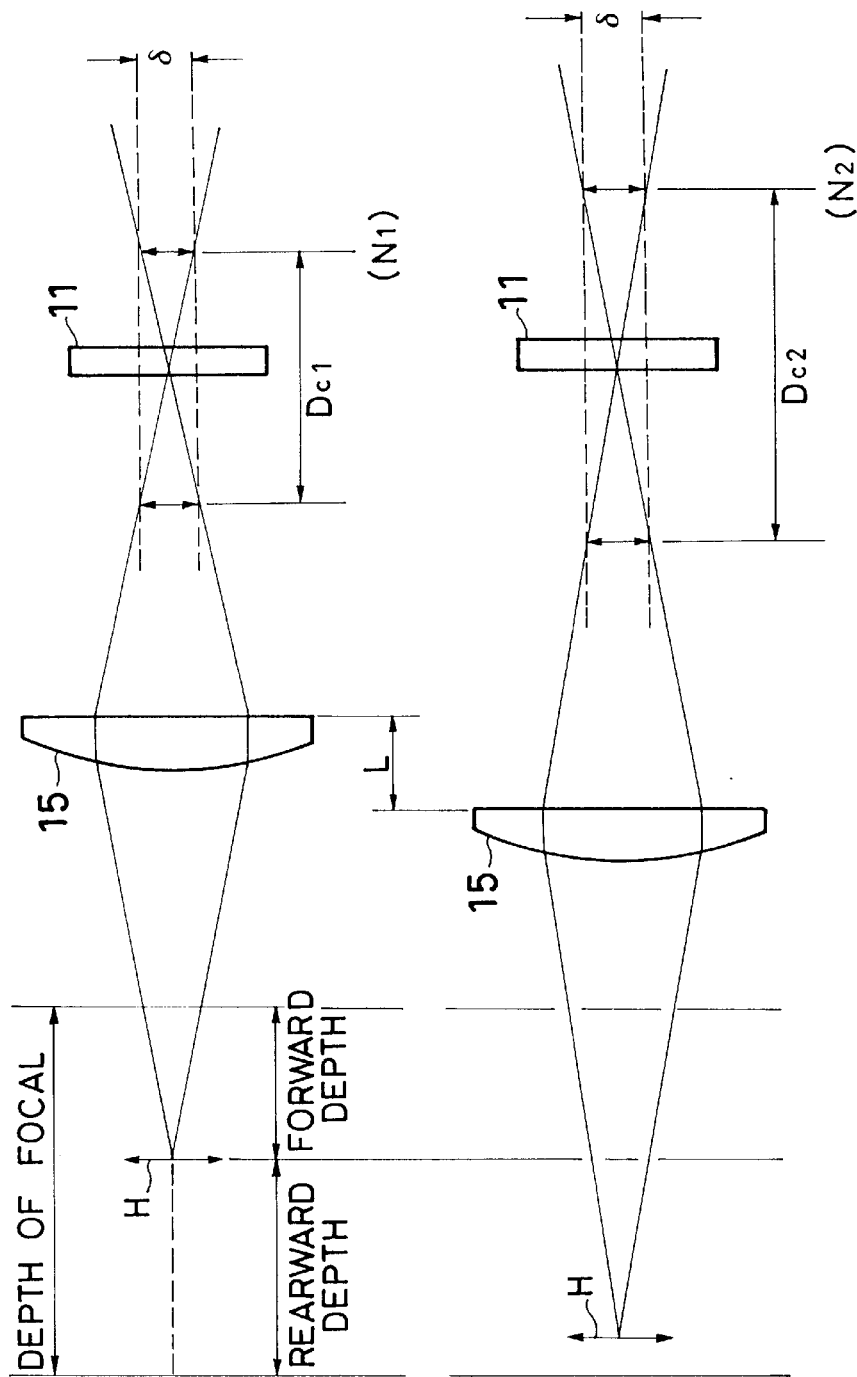
FIG. 4 (A) is a diagram illustrating the depth of focus when the diaphragm is reduced on the camera of FIG. 5.

FIGS. 1 (A) and (B) through FIGS. 4 (A) and (B) show the arrangement of the front end of a micro-camera as one embodiment of fixed focus camera. Components are described by referring to FIG. 1 (A) and (B)–FIG. 3. In the figures, the camera body 10 is provided with a CCD 11 as an imaging element. The CCD 11 is connected to a signal processing section through signal lines (not shown). The camera body 10 is screwed and connected to a separate front section (tube) 12 with a helicoid screw section 13. A male screw 13A is formed on the front end of the body 10, and a female screw 13B screwed in the male screw 13A is formed on the rear end of the front section 12. The front section 12 is rotated by the connection of male screw 13A and female screw 13B. During the rotation, the front section 12 is moved forward by a predetermined length L by the screw pitch of the helicoid screw section 13 as shown in FIG. 1 (B). The front section 12 is mounted with a fixed focus objective lens system 15 with a focal distance f which may consist of a plurality of lenses. A diaphragm member 16 is mounted behind the objective lens system 15.

Figure 2A:
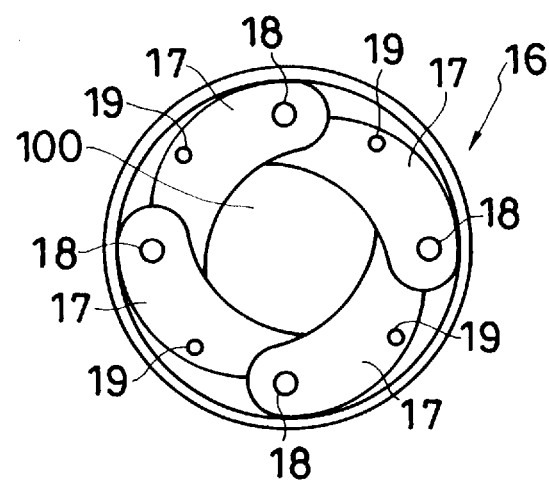
FIG. 2 (A) is the arrangement of blades on the body in a diaphragm member of the embodiment.
Figure 2B:
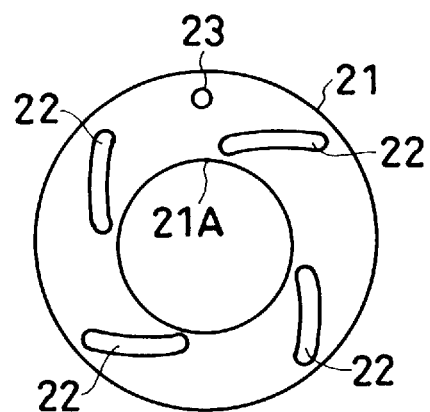

FIGS. 2 (A) and (B) show the arrangement of the diaphragm member 16. In the embodiment, as shown in FIG. 2 (A), a plurality of blades 17 (four blades in the figure) are supported by a shaft 18 for adjusting the opening 100 of the diaphragm. Each blade 17 has a drive pin 19.

A rotating plate 21 with an opening 21A is placed in parallel in front of the blade 17 as shown in FIG. 2 (B). The rotating plate 21 is formed with a guide groove 22 extending toward the center of circle in which groove 21 the drive pin 19 on the blade 17 engages. Accordingly, when the rotating plate 21 is rotated to the right (or rotating the blade support to the left), four blades 17 move to the center so that the diaphragm opening 100 is reduced. On the other hand, when the rotating plate 21 is rotated in the reverse direction, the four blades 17 move outward so that the diaphragm opening 100 is enlarged.

In addition, a connecting rod 23 is mounted on the rotating plate 21, and inserted into a hole 24 formed in a cylindrical wall of the camera body 10 so that it can move back and forth as shown in FIGS. 1 (A) and (B). Accordingly, the rotating plate 21 constrains the rotation of the front section 12 when it is rotated, whereby, in the diaphragm member 16 of the embodiment, the size of the diaphragm opening 100 would be variably controlled by rotating the support supporting the blade 17.

Then, the CCD 11, the objective lens system 15 and the diaphragm member 16 described above are arranged in the relationship as shown in FIGS. 4 (A) and (B). That is, while both FIGS. 4 (A) and (B) show the state where the diaphragm opening 100 is reduced to a predetermined value, the CCD 11 is placed so that the subject is imaged on the imaging plane at the focal distance (fixed focus) f of the objective lens system 15 as the diaphragm opening 100 is maximized by the blades 17 as in the case of FIG. 4 (A). The focal distance f of the embodiment is set at the far distance.

In this case, the depth of field at the subject H is as shown in the figure. When the diaphragm opening 100 is reduced, the objective lens system 15 is extended forward so that the depth behind the depth of field is set at the infinite ($\infty$) point. Therefore, the subject H is positioned at the hyperfocal distance. Thus, the depth of focus D can be made deeper as shown in FIG. 4 (B) by shooting the subject H at the hyperfocal distance.

Figure 5:
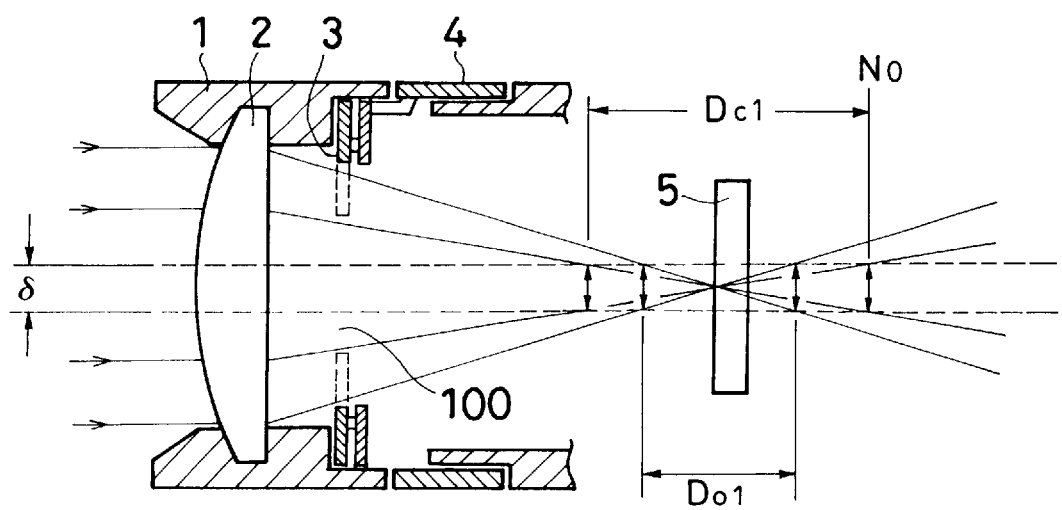
FIG. 5 is a schematic sectional view showing a conventional fixed focus camera.

In other words, when FIG. 4 (A) is assumed to be a state where the diagram opening 100 is reduced by the conventional arrangement of FIG. 5, and FIG. 4 (B) is assumed to be a state where the diaphragm opening 100 is reduced by the same amount by the present invention, the depth of focus Dc1 (a region contained in the minimum blur circle with the diameter 6) of FIG. 4 (A) obtained by shooting at the ordinary focal distance becomes as deep as the depth of focus Dc2 of FIG. 4 (B) by setting the rearward depth at the infinite point. Generally, when the subject H is set at the hyperfocal distance, it is said that the forward depth is one half of the hyperfocal depth, and the depth of field contains a distance one half the hyperfocal depth to the infinite point. This means that it does not depend on the size of diaphragm opening 100, so that, when the diaphragm opening 100 is reduced, the depth of focal is made further deep.

In addition, as shown in FIG. 3, marked on the outer surface of the front section 12 are a mark $\infty$ (far distance) in the rotating direction for maximizing the diaphragm opening 100, and a mark N (near distance) in the rotating direction for minimizing the diaphragm opening 100.

The embodiment is arranged as above. Its operation is briefly described in the following. First, when the front section 12 is rotated until it stops at the far distance position ($\infty$) as shown in FIG. 3, the diaphragm opening 100 is maximized with the blades 17 as shown in FIG. 1 (A), and the objective lens system 15 is retracted to be positioned at a position nearest to the CCD 11. At the moment, the relationship between the imaging plane of the CCD 11 and the objective lens system 15 is same as that of the prior art shown in FIG. 5, so that, at this far distance position, a subject at any distance where an object is imaged in the range of depth of focus Do1 can be imaged well. In this case, the shortest distance where shooting can be performed is the position of N1.

Then, when the front section 12 is rotated to the near distance (N) from the far distance, the diaphragm opening 100 is reduced with the blades 17, and the objective lens system 15 is extended forward. When the front section 12 is rotated until it stops, the diaphragm opening 100 is maximized as shown in FIG. 1 (B), and the objective lens system 15 is positioned at a position nearest to the CCD 11 (only moved by a length L).

At the moment, as described in conjunction with FIG. 4 (B), the rearward depth is set at $\infty$, the forward depth becomes one half the hyperfocal distance, and the depth of focus is within a range from one half the hyperfocal distance to $\infty$. Then, at this near distance, it is possible to shoot a subject H at a distance where it is imaged within the depth of focus Dc2. The nearest distance where shooting can be performed is a position N2 which is closer than the position N1 [FIG. 1 (B)]. That is, since the above range Dc2 is deeper than the conventional range Dc1 shooting can be performed at a distance which is nearer than the conventional distance by that amount. Thus, in the embodiment, the minimum object distance (MOD) for shooting would be shorter than the prior art.

While, in the above embodiment, the objective lens system 15 is incorporated with the diaphragm member 16, these components can be separately arranged to attain the same operation. In addition, while the objective lens system 15 can be constituted by a plurality of lenses, the diaphragm member 16 may be displaced in the lens group.

As described, since the present invention is arranged in such a manner, when the diaphragm opening is reduced for a camera having a fixed focus objective lens system and a diaphragm member, the objective lens system is extended forward interlocking with rotation of the rotating member of the diaphragm member, shooting can be performed at the hyperfocal distance, whereby the minimum object distance for shooting can be shortened than that of the prior art by the focus control with the diaphragm.

In addition, since the objective lens system and the diaphragm member are mounted on the same tube which is rotated by a helicoid screw to open or close the diaphragm and to move the objective lens system back and forth, opening or closing of the diaphragm and movement of the lens system can be performed with single operation of the tube, whereby the arrangement can be simplified.

What is claimed is:

1. A fixed focus camera performing shooting at a hyperfocal distance comprising:

a lens section formed to provide fixed focus;

a diaphragm member provided with a rotating member which is rotated to reduce light from the lens section; and drive means for extending and retracting the lens section in interlocking with rotation of the rotating member of the diaphragm member to move said lens section forth so that a subject is captured at a hyperfocal distance when the diaphragm opening is reduced.

2. The fixed focus camera performing shooting at a hyperfocal distance as set forth in claim 1, wherein said lens section and said diaphragm member are mounted on the same tube, said tube being connected to the body with a helicoid screw so that the rotation of the tube opens and closes said diaphragm member, and moves said lens section back and forth.

* * * * *